(12) United States Patent
Mamidwar et al.

(10) Patent No.: US 11,025,690 B2
(45) Date of Patent: Jun. 1, 2021

(54) AUDIO-VIDEO (AV) PACKET DELIVERY OVER A LOCAL AREA NETWORK

(71) Applicant: Avago Technologies International Sales Pte. Limited, Singapore (SG)

(72) Inventors: Rajesh Shankarrao Mamidwar, San Diego, CA (US); Sanjeev Sood, San Diego, CA (US); Prashant Katre, San Diego, CA (US); Arnab Bhattacharya, San Diego, CA (US); Amit R. Agarwal, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 15 days.

(21) Appl. No.: 16/268,403

(22) Filed: Feb. 5, 2019

(65) Prior Publication Data

US 2019/0245901 A1    Aug. 8, 2019

Related U.S. Application Data

(60) Provisional application No. 62/626,610, filed on Feb. 5, 2018, provisional application No. 62/626,613, filed on Feb. 5, 2018.

(51) Int. Cl.
*H04L 29/06* (2006.01)

(52) U.S. Cl.
CPC ...... *H04L 65/4092* (2013.01); *H04L 65/4069* (2013.01); *H04L 65/601* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 6,434,620 B1* | 8/2002 | Boucher | H04L 29/06 709/230 |
| 2004/0042483 A1* | 3/2004 | Elzur | H04L 69/10 370/463 |
| 2014/0012972 A1* | 1/2014 | Han | H04L 69/16 709/224 |
| 2015/0113158 A1* | 4/2015 | Mamidwar | H04L 67/32 709/231 |

* cited by examiner

*Primary Examiner* — Jeffrey R Swearingen
(74) *Attorney, Agent, or Firm* — Morgan, Lewis & Bockius LLP

(57) ABSTRACT

A network device providing audio-video packet delivery over a local area network may include a memory and at least one processor. The at least one processor may be configured to receive data packets from a server, the data packets being addressed to an electronic device downstream from the network device. The at least one processor may be further configured to determine whether the data packets satisfy an offload condition. The at least one processor may be further configured to, when the data packets satisfy the offload condition: transmit, to the server, acknowledgement packets corresponding to the received data packets, store the data packets in a buffer, transmit the data packets to the electronic device, and retransmit the data packets to the electronic device responsive to request therefor, the retransmitted data packets being retrieved from the buffer.

17 Claims, 7 Drawing Sheets

AUDIO-VIDEO (AV) PACKET DELIVERY OVER A LOCAL AREA NETWORK

CROSS-REFERENCE TO RELATED APPLICATIONS

The present application claims the benefit of U.S. Provisional Patent Application Ser. No. 62/626,610, entitled "Local Area Network Retransmission," filed on Feb. 5, 2018, and claims the benefit of U.S. Provisional Patent Application Ser. No. 62/626,613, entitled "Source Data Rate Control," filed on Feb. 5, 2018, both of which are hereby incorporated by reference in its entirety for all purposes.

TECHNICAL FIELD

The present description relates generally to AV packet delivery over a local area network, including local area network retransmission of AV packets and local area network rate control for transmission of AV packets.

BACKGROUND

Electronic devices connected to a local area network may stream audio-video (AV) packets from a content server over a wide area network, such as the Internet. The AV packets may be transmitted by the content server over the wide area network to a network device coupled to the local area network, such as a router or a switch. The AV packets may then be forwarded by the network device to the electronic devices over the local area network.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The delivery of AV packets from a content server over a wide area network to a network device, and then from the network device over a local area network to electronic devices, may be enhanced when characteristics of the local area network segment are taken into account. For example, if the electronic devices are communicatively coupled to the network device via a wireless connection, such as Wi-Fi, there may be packet loss that is specific to the local area network segment (e.g., packet loss that occurs after the AV packets are received by the network device). Similarly, if the electronic devices are communicatively coupled to the network device via a wired connection, e.g., Ethernet, and the electronic devices are capable of different data transfer rates, e.g., 100 Megabit per second (Mbps) versus 1 Gigabit per second (Gbps), back pressure specific to the local area network may be generated for the 100 Mbps electronic device due to transmission of back-to-back packets over the local area network.

The subject system provides for local area network retransmission of AV packets, such that AV packets that are lost on the local area network segment can be retransmitted to the electronic devices from the network device, e.g., without having to make a roundtrip to the content server. The subject system also provides for local area network rate control of AV packet transmission by pacing packets on every Ethernet boundary for each content stream transmitted by the network device, thereby removing network bursts and avoiding back pressure for a slower electronic device on the network (e.g., a 100 Mbps electronic device relative to a 1 Gbps electronic device). Thus, the subject system enables, for example, more efficient AV packet delivery over a local area network.

Figure 1:
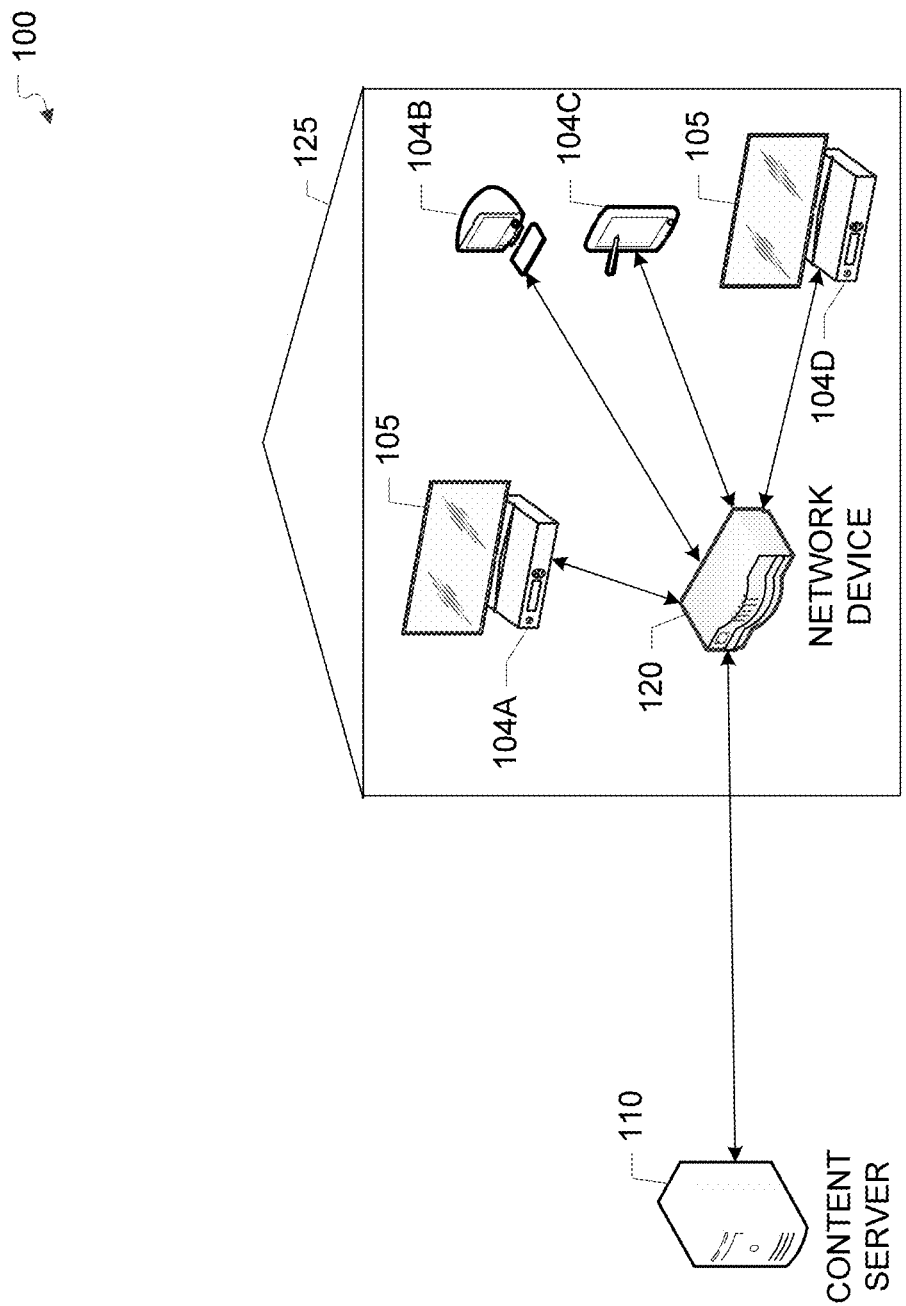
FIG. 1 illustrates an example network environment in which AV packet delivery over a local area network may be implemented in accordance with one or more implementations.

FIG. 1 illustrates an example network environment 100 in which AV packet delivery over a local area network may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content server 110, a unit 125, a network device 120, one or more electronic devices 104A-D, and one or more display devices 105. The unit 125 may be a building, a dwelling unit, a house, an office, or any generally physical or logical structure that may be associated with a wireless local area network and/or a wired local area network. The electronic devices 104A-D can be computing devices such as laptop or desktop computers, smartphones, virtual reality headsets, portable media players, set-top boxes, tablet computers, televisions or other displays with one or more processors coupled thereto and/or embedded therein, or other appropriate computing devices that can be used for receiving and/or rendering multimedia content and/or can be coupled to such a device.

In the example of FIG. 1, the electronic devices 104A and 104D are depicted as a set-top boxes or media players, e.g. a device that is coupled to, and is capable of displaying video content on, a display device 105, such as a television, a monitor, or any device capable of displaying video content. In one or more implementations, one or more of the electronic devices 104A,D may be integrated into the display device 105 and/or the display device 105 may be capable of outputting audio content in addition to video content. In the example of FIG. 1, the electronic device 104B is depicted as a desktop computer and the electronic device 104C is depicted as a tablet device.

The content server 110 may be, and/or may be associated with, a headend that may include one or more devices, such as network devices, transmitters, receivers, etc., that are part of a content delivery network (CDN) that coordinates the delivery of content streams, such as television programs, movies, audio programs, or generally any content streams. The content delivery network may deliver the content streams to the electronic devices 104A-D, e.g. over a wide area network, such as the Internet, to the network device 120, and then the content streams may be transmitted by the network device 120 over a local area network to the electronic devices 104A-D. In one or more implementations, the headend may also provide Internet service to the electronic devices 104A-D, e.g. via the network device 120.

In one or more implementations, the content server 110 may be a single computing device such as a computer server, or the content server 110 may represent multiple computing devices, such as a cloud of computers, that are working together to perform the actions of a server computer (such as a cloud of computers and/or a distributed system). The content server 110 may be coupled with various databases, storage services, or other computing devices, such as an adaptive bit rate (ABR) server, that may be collocated with the content server 110 or may be disparately located from the content server 110. In one or more implementations, one or more of the content server 110, the network device 120, and/or one or more of the electronic devices 104A-D may be, or may include, one or more components of the electronic system discussed below with respect to FIG. 7.

The network device 120 may be and/or may include, for example, a switch or a router, that is configured to directly and/or indirectly couple the electronic devices 104A-D to the content server 110. The network device 120 may include local area network interfaces, such as wired interfaces and/or wireless access points, for communicating with the electronic devices 104A-D. In one or more implementations, the network device 120 may be, or may include, a media center and/or a set-top box, e.g. a device that is coupled to a display, such as a television, and is capable of rendering multimedia content on the display. In one or more implementations, the network device 120 may be representative of multiple network devices, such as a cable modem, a wireless router, and the like.

In one or more implementations, in addition to a host processor, the network device 120 may implement an advanced stream processor (ASP) (e.g., a secondary processor) that may be dedicated to handling networking tasks for audio and/or video streams. For example, the network device 120 may be a media center and/or set-top box with an ASP that sits between a wired cable modem and a wireless access point in the unit 125. An example network device 120 implementing an ASP is discussed further below with respect to FIG. 3.

When one or more of the electronic devices 104A-D, such as the electronic device 104A, is receiving audio and/or video packets, such as adaptive bit rate (ABR) streaming segments, from the content server 110 via the network device 120 using a wireless networking technology, such as WiFi, the electronic device 104A may incur a significant number of retransmissions at the TCP layer. Since the packets are originating from the content server 110, the TCP retransmission requests may be addressed to the content server 110. However, when the network device 120 includes the ASP, the TCP connections for the audio and/or video packets may be routed via the ASP of the network device 120, where the ASP acts as a proxy for the TCP connections, the ASP acts as a sink/client with respect to the content server 110, and/or the ASP may act as a TCP server for the electronic devices 104A-D.

In this manner, when TCP packets are received by the network device 120 from the content server 110, such as via a cable modem, the packet payload may be stored in a separate buffer for each TCP connection (and/or one or more TCP connections may share a buffer), and a new TCP connection is processed with respect to the electronic device 104A to which the packet is addressed. Thus, the ASP of the network device 120 can operate transparently to the electronic devices 104A-D and the content server 110.

The ASP of the network device 120 may transmit acknowledgement packets to the content server 110 for received packets intended for transmission to the electronic devices 104A-D, and may store the packet payloads in the buffer until acknowledgement packets corresponding to the payloads are received from the electronic devices 104A-D. In this regard, if an electronic device 104A transmits a retransmission request for one of the packets, the payload of the packet can be retrieved from the buffer of the ASP of the network device 120 and retransmitted to the electronic device 104A by the network device 120 without having to send the retransmission request back to the content server 110. Thus, the latency of the retransmission is reduced while also reducing the amount of upstream traffic transmitted back to the content server 110.

An example network environment implementing packet retransmission at the network device 120 is discussed further below with respect to FIG. 3, and an example process of packet retransmission at the network device 120 is discussed further below with respect to FIG. 5.

In one or more implementations, the network device 120 may function as a local media server for streaming content to one or more other of the electronic devices 104A-D. For example, the network device 120 may include and/or may be part of a set-top box that includes a DVR that stores recorded content that the network device 120 may serve to one or more of the electronic devices 104A-D, and/or the network device 120 may act as a proxy for forwarding content streams, such as live television, to the electronic devices 104A-D.

Furthermore, one or more of the electronic devices 104A-D, such as the electronic device 104D may be communicatively coupled to the network device 120 via a wired connection, such as Ethernet, and may support a data rate of 1 Gbps, while another of the electronic devices 104A-D, such as the electronic device 104A, may be communicatively coupled to the network device 120 via a wired connection, such as Ethernet, and may only support a data rate of 100 Mbps. Thus, the electronic device 104D may be capable of concurrently receiving four 40 Mbps content streams (e.g., for multi-picture in picture), while the electronic device 104A may only be capable of concurrently receiving two 40 Mbps content streams (e.g. for picture in picture).

Conventionally when the electronic device 104A retrieves one of the content streams from the network device 120, the electronic device 104A may slow the entire network down to close to 100 Mbps. For example, when another network device, such as a gigabit switch device, sits between the network device 120 and the electronic device 104A, big chunks of a single content stream may be served by the network device 120 to the electronic device 104A at a gigabit data rate. However, since the electronic device 104A cannot accept the gigabit data rate, the electronic device 104A may generate Xoff as back pressure or may drop packets and slow down the entire network.

In the subject system, the network device 120 may generate and serve Ethernet packets at a regular interval without any back-to-back packets being transmitted for a single content stream (when multiple content streams are being transmitted by the network device 120 to one or more of the electronic devices 104A-D). Thus, after the network device 120 transmits one packet to a 100 Mbps client, such as the electronic device 104A, the network device 120 transmits the next packet to a different electronic device, such as the electronic device 104D, and/or the network device 120 transmits the next packet from another content stream being transmitted to the electronic device 104A. In this manner, congestion is avoided by pacing packets at the source, e.g. the network device 120, and therefore the network can sustain peak bandwidth. In one or more implementations, the packets for each stream may be individually paced at the source, e.g. by the network device 120.

An example network environment implementing local area network rate control for transmission of AV packets at the network device 120 is discussed further below with respect to FIG. 4, and an example process of local area network rate control for transmission of AV packets is discussed further below with respect to FIG. 6.

For explanatory purposes, the subject system is discussed with reference to audio and/or video streams. However, the subject system may also be applicable to any packets and/or any streams.

Figure 2:
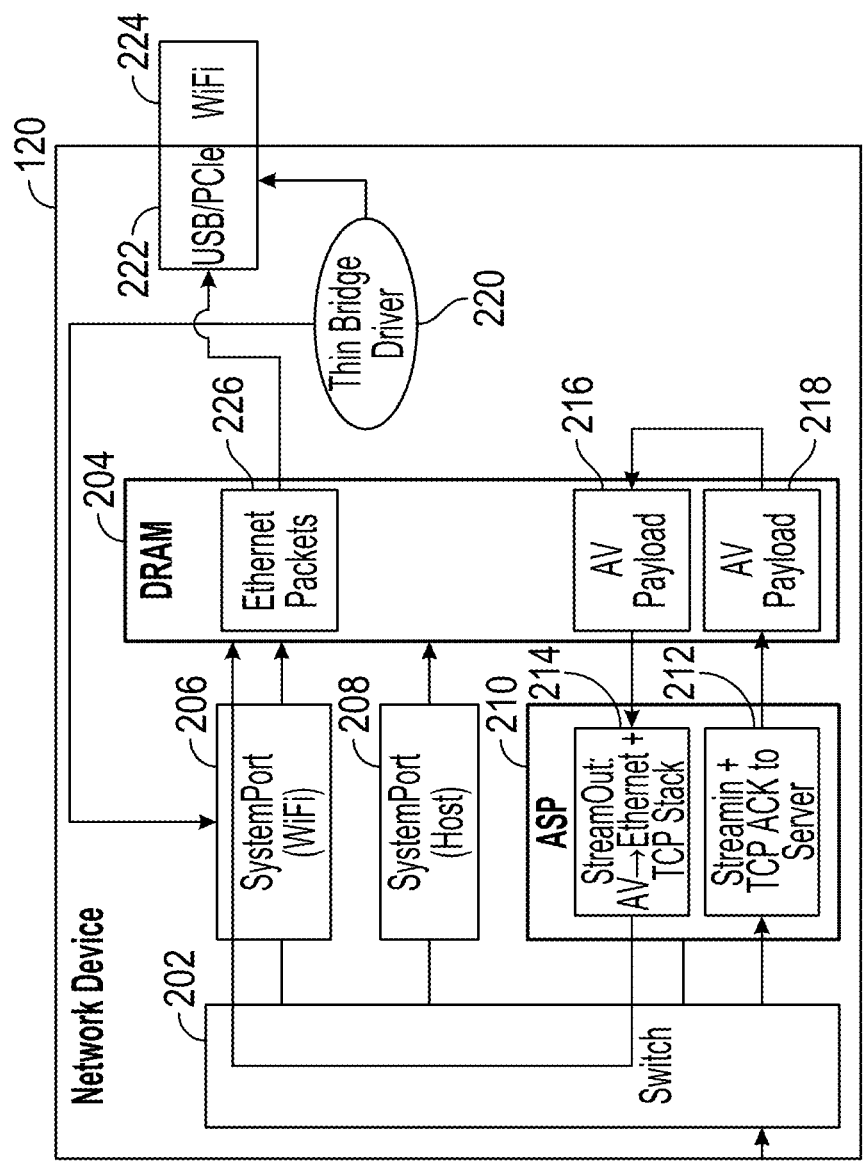
FIG. 2 illustrates an example network device that may be used for AV packet delivery over a local area network in accordance with one or more implementations.

FIG. 2 illustrates an example network device 120 that may be used for AV packet delivery over a local area network in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network device 120 includes a switch device 202, a memory 204, a WiFi system port 206, a host (e.g., Linux) system port 208, an ASP 210, a thin bridge driver 220, a USB/PCIe interface 222, and a WiFi module 224. The ASP 210 includes a stream-in module 212 and a stream-out module 214. In FIG. 2, the memory 204 is illustrated as being DRAM and storing AV payloads 216, 218 and Ethernet packets 226; however, any type of suitable memory may be used.

The ASP 210 may support identifying packets by connection at the TCP level, such as a separate TCP/IP connection for each video channel/content stream in the local area network, and separating those connections in the memory 204. The ASP 210 may process a complete TCP stack to act as a TCP client/sink for the content server 110 and to act as a TCP server/source for one or more of the electronic devices 104A-D, such as the electronic devices connected via WiFi.

The network device 120 may be configured to determine whether a given content stream, data stream, or TCP connection should be offloaded to the ASP 210 for processing based at least in part on whether the content stream, data stream, or TCP connection satisfies an offload condition. For example, the network device 120 may identify each TCP/IP connection connected via wired and/or wireless connections and determine whether each connection satisfies an offload condition. An offload condition may be satisfied, for example, when the stream/connection has a high bit rate, when a number of acknowledgment packets and/or retransmission requests for the stream/connection satisfies a threshold amount, when the stream/connection is transmitting audio and/or video packets, and/or whether a user configurable setting has been received that indicates that a particular source and/or destination of the stream/connection should be offloaded, such as web domains corresponding to video streaming services.

When a stream/connection of a particular electronic device 104A is offloaded to the ASP 210, the ASP 210 receives TCP packets of the stream/connection via the stream-in module 212 and the stream-in module 212 transmits acknowledgements for the packets to the content server 110, e.g., before or after the packets are transmitted to the electronic device 104A. Thus, the acknowledgment packets transmitted by the ASP 210 to the content server 110 are transmitted independently of whether the packets have actually been transmitted to their addressed destination, e.g., the electronic device 104A. The stream-in module 212 may also transmit priority flow control packets to the content server 110 based on any congestion over the wide area network between the network device 120 and the content server 110. The ASP 210 also stores the payloads 216, 218 of each received packet in the memory 204, transmits separately generated Ethernet packets containing the payloads to the electronic device 104A via the stream-out module 214, and removes the payloads 216, 218 from the memory 204 when a corresponding acknowledgment packet is received from the electronic device 104A.

The switch device 202 facilitates communicating received data packets to the appropriate component in the network device 120. The thin bridge driver 220 facilitates transmitting Ethernet packets 226 from the memory 204 to the USB/PCIe interface 222 and the WiFi module 224, and vice-versa.

In one or more implementations, one or more of the switch device 202, the memory 204, the WiFi system port 206, the host system port 208, the ASP 210, the thin bridge driver 220, the USB/PCIe interface 222, the WiFi module 224, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
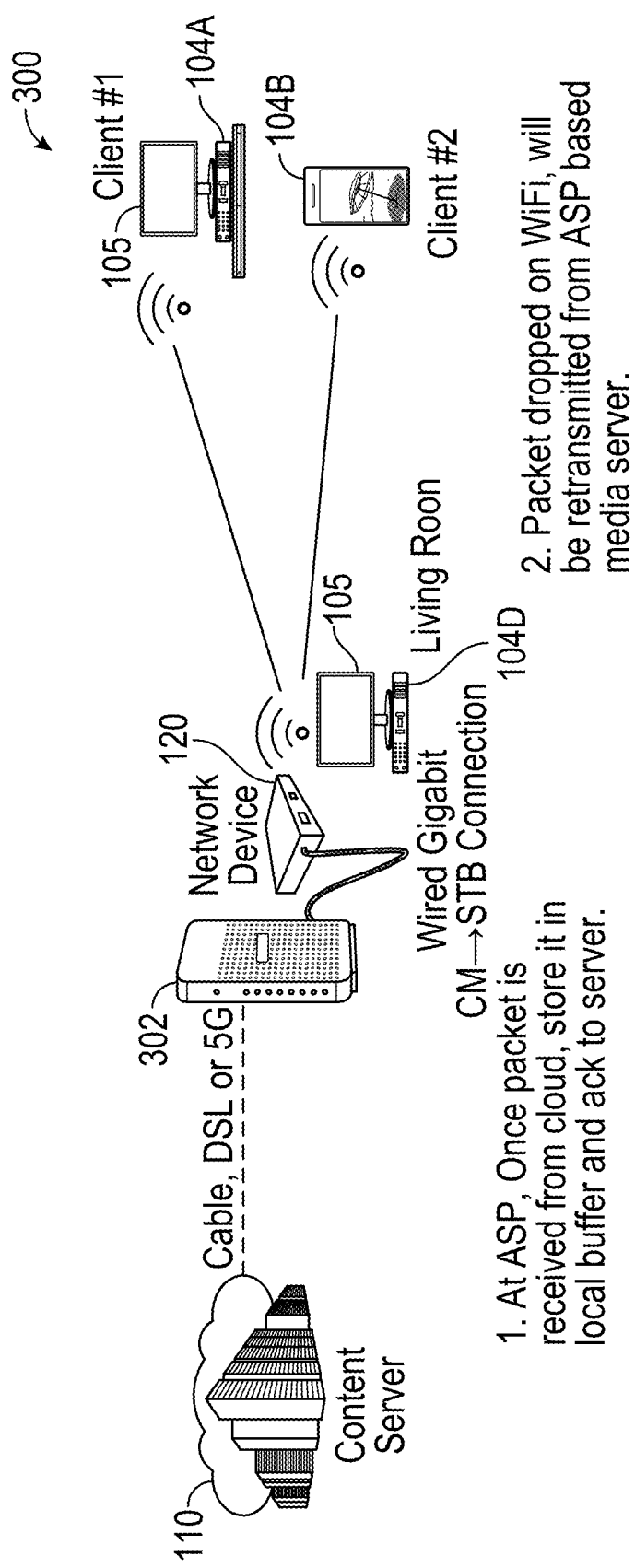
FIG. 3 illustrates an example local area network including a network device that may be used for local area network retransmission of AV packets in accordance with one or more implementations.

FIG. 3 illustrates an example local area network 300 including a network device 120 that may be used for local area network retransmission of AV packets in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network environment 300 includes the content server 110, the network device 120, a network device 302, the electronic devices 104A,B,D and the display devices 105. The network device 302 may be a network device that provides a wide area network connection, such as an Internet connection, to the network device 120, and consequently the electronic devices 104A,B,D. For example, the network device 302 may be a cable modem, a satellite modem, a DSL modem, a 5G wireless modem, or generally any network device capable of providing a wide-area network connection. The network device 302 may be, for example, coupled to the network device 120 via a wired connection, such as a wired Gigabit connection. In the network environment 300, the electronic devices 104A,B,D are communicatively coupled to the network device 120 via a wireless connection, such as a WiFi connection.

As illustrated in FIG. 3, the content server 110 transmits data packets addressed to one or more of the electronic devices 104A,B,D over a wide area network to the network device 120 via the network device 302. The network device 120 receives the data packets, determines that the data packets satisfy an offload condition and offloads processing of the packets to the ASP 210 of the network device 120. The ASP 210 transmits an acknowledgement for each received packet to the content server 110, stores the payload of each received packet in the memory 204, and packetizes each AV payload into an additional Ethernet packet for transmission to one or more of the electronic devices 104A,B,D.

If one of the additional Ethernet packets is dropped over the local area network and a retransmission request is received from one or more of the electronic devices 104A, B,D, such as the electronic device 104A, the network device 120 retrieves the buffered payload for the packet, repacketizes the buffered payload into another packet, and transmits the packet to the electronic device 104A. Thus, dropped packets can be retransmitted from the network device 120, e.g., without having to make a roundtrip back to the content server 110.

Figure 4:
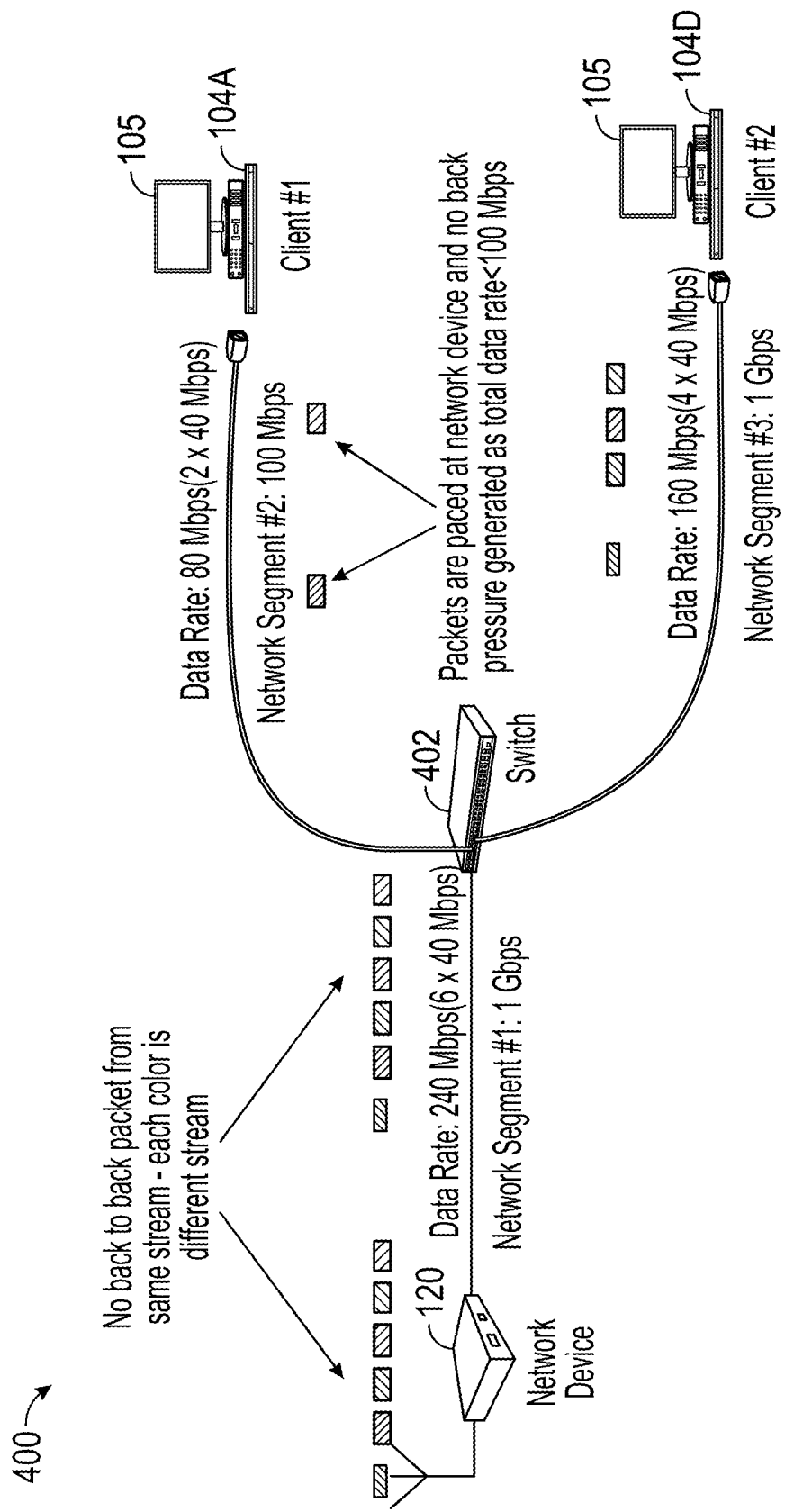
FIG. 4 illustrates an example network environment including a network device that may be used for local area network rate control for transmission of AV packets in accordance with one or more implementations.

FIG. 4 illustrates an example network environment 400 including a network device 120 that may be used for local area network rate control for transmission of AV packets in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network environment 400 includes the network device 120, the switch device 402, the electronic devices 104A,D, and the display devices 105. In the network environment 400, the electronic devices 104A,D are communicatively coupled to the network device 120 via wired Ethernet connections through the switch device 402. The electronic device 104A supports a 100 Mbps connection, while the electronic device 104D (and the switch device 402) supports a 1 Gbps connection.

In the network environment 400, the network device 120 is operating as a media server for the electronic devices 104A,D, e.g., by serving local content and/or content received from the content server 110. The electronic devices 104A,D request one or more content streams from the network device 120, and the network device 120 transmits the one or more content streams to the electronic devices 104A,D. In the network environment 400, the electronic device 104A is receiving two 40 Mbps content streams, such as for picture in picture, and the electronic device 104D is receiving four 40 Mbps content streams, such as for multi-picture in picture.

In order to avoid burstiness and congestion over the local area network, the network device 120 performs packet spacing on each Ethernet boundary of each content stream such that no back to back packets are transmitted from any single stream. Thus, each packet that is transmitted from the network device 120 corresponds to a different content stream than the previously transmitted packet. Since the packets are properly paced in this manner, no backpressure is generated at the electronic device 104A which has a lower data transfer rate relative to the electronic device 104D. The packet by packet pacing may be performed on every Ethernet packet boundary for each given content stream by hardware, e.g., the ASP 210, and/or by software, e.g., at the expense of CPU cycles that may slow down other applications. In one or more implementations, the packet by packet pacing may be performed on content received from the content server 110 and/or on network traffic generated by the network device 120.

Although the network environment 400 is described herein with respect to AV packets, the subject system can be implemented on any data once the network topology and/or data transfer rates of the client devices are determined.

Figure 5:
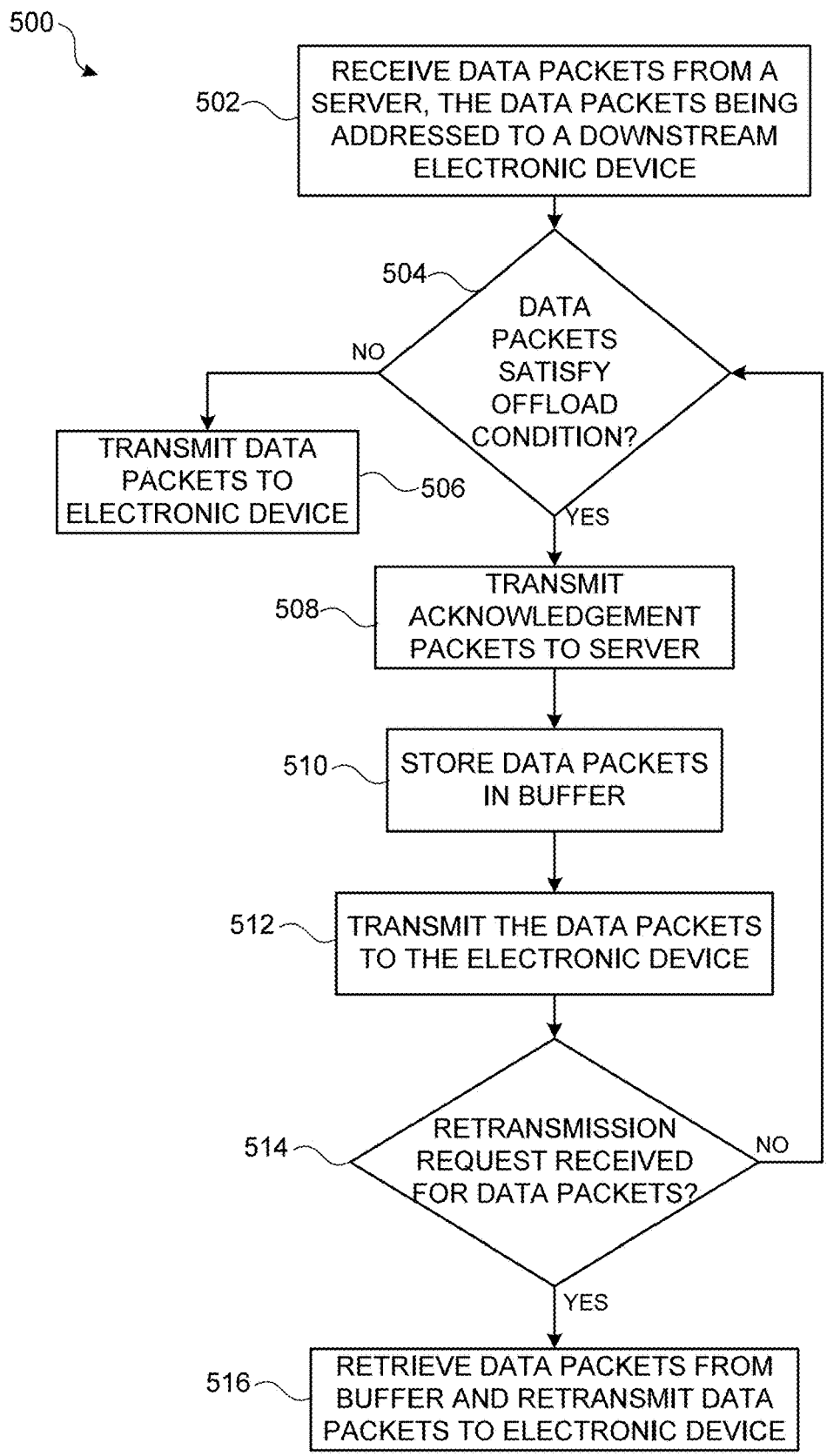
FIG. 5 illustrates a flow diagram of an example process for local area network retransmission of AV packets in accordance with one or more implementations.

FIG. 5 illustrates a flow diagram of an example process 500 for local area network retransmission of AV packets in accordance with one or more implementations. For explanatory purposes, the process 500 is primarily described herein with reference to the network device 120 of FIGS. 1-4. However, the network device 120 is presented as an exemplary device and one or more of the operations described herein may be performed by any suitable device. Further for explanatory purposes, the operations of the process 500 are described herein as occurring in serial, or linearly. However, multiple operations of the process 500 may occur in parallel. In addition, the operations of the process 500 need not be performed in the order shown and/or one or more of the operations of the process 500 need not be performed and/or can be replaced by other operations.

The network device 120 receives data packets from a server, such as the content server 110, that are addressed to an electronic device downstream from the network device 120, such as the electronic device 104A (502). The network device 120 determines whether the data packets and/or the associated TCP connection satisfy one of the previously described offload conditions (504). If the data packets do not satisfy an offload condition (504), the network device 120 transmits the data packets to the electronic device 104A, e.g. without buffering the data packets or the payloads (506).

If the data packets and/or associated TCP connection satisfy the offload condition (504), the network device 120 offloads the associated TCP connection to the ASP 210, transmits an acknowledgement of the packets to the content server 110 (508) and stores the data packets in a buffer, such as the memory 204 (510). In one or more implementations, the network device 120 may only buffer the payloads of the data packets in the memory 204.

The network device 120 then transmits the data packets to the electronic device 104A (512). In one or more implementations, the network device 120 retrieves the payloads from the memory 204, repacketizes the payloads into separate packets, and transmits the separate packets to the electronic device 104A. If the network device 120 receives a retransmission request from the electronic device 104A with respect to one or more of the transmitted packets (514), the network device 120 retransmits the requested data packets to the electronic device 104A (516). In one or more implementations, the network device 120 may retrieve the buffered payloads from the memory 204, repacketize the payloads into additional packets, and transmit the additional packets to the electronic device 104A.

Figure 6:
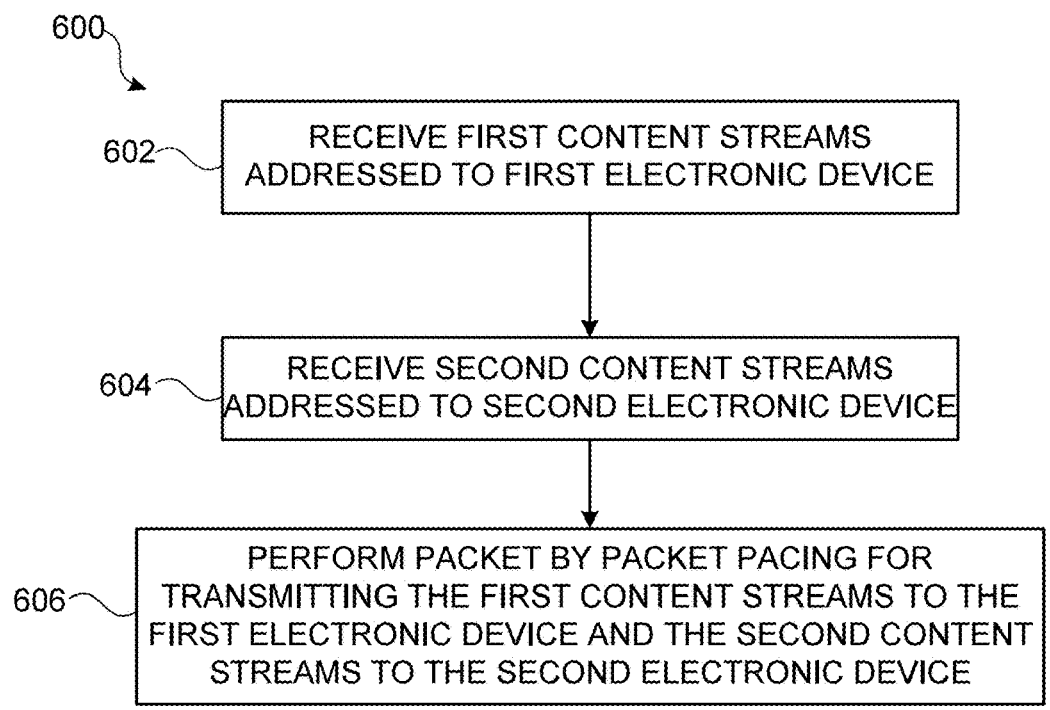
FIG. 6 illustrates a flow diagram of an example process for local area network rate control for transmission of AV packets in accordance with one or more implementations.

FIG. 6 illustrates a flow diagram of an example process 600 for local area network rate control for transmission of AV packets in accordance with one or more implementations. For explanatory purposes, the process 600 is primarily described herein with reference to the network device 120 of FIGS. 1-4. However, the network device 120 is presented as an exemplary device and one or more of the operations described herein may be performed by any suitable device. Further for explanatory purposes, the operations of the process 600 are described herein as occurring in serial, or linearly. However, multiple operations of the process 600 may occur in parallel. In addition, the operations of the process 600 need not be performed in the order shown and/or one or more of the operations of the process 600 need not be performed and/or can be replaced by other operations.

The network device 120 receives first content streams addressed to a first electronic device, such as the electronic device 104A (602), and second content streams addressed to a second electronic device, such as the electronic device 104D (604). In one or more implementations, the electronic devices 104A,D may be communicatively coupled to the network device 120 via a wired connection, such as via a switch device, and/or the electronic devices 104A,D may be capable of different data transfer rates. The electronic devices 104A,D may have previously requested the content streams, such as from the content server 110.

The network device 120 performs packet by packet spacing for transmitting the first and second content streams to the first and second electronic devices 104A,D (606). For example, each subsequent packet transmitted by the network device 120 to one of the electronic devices 104A,D may be from a different content stream such that no two consecutively transmitted packets are from the same content stream. The packet by packet pacing may also be dependent on the data transfer rates supported by the electronic devices 104A,D such that, e.g., multiple packets may be transmitted to the electronic device 104D that supports a higher data transfer rate for each data packet transmitted to the electronic device 104A that supports a lower data transfer rate (e.g., relative to the electronic device 104D).

Figure 7:
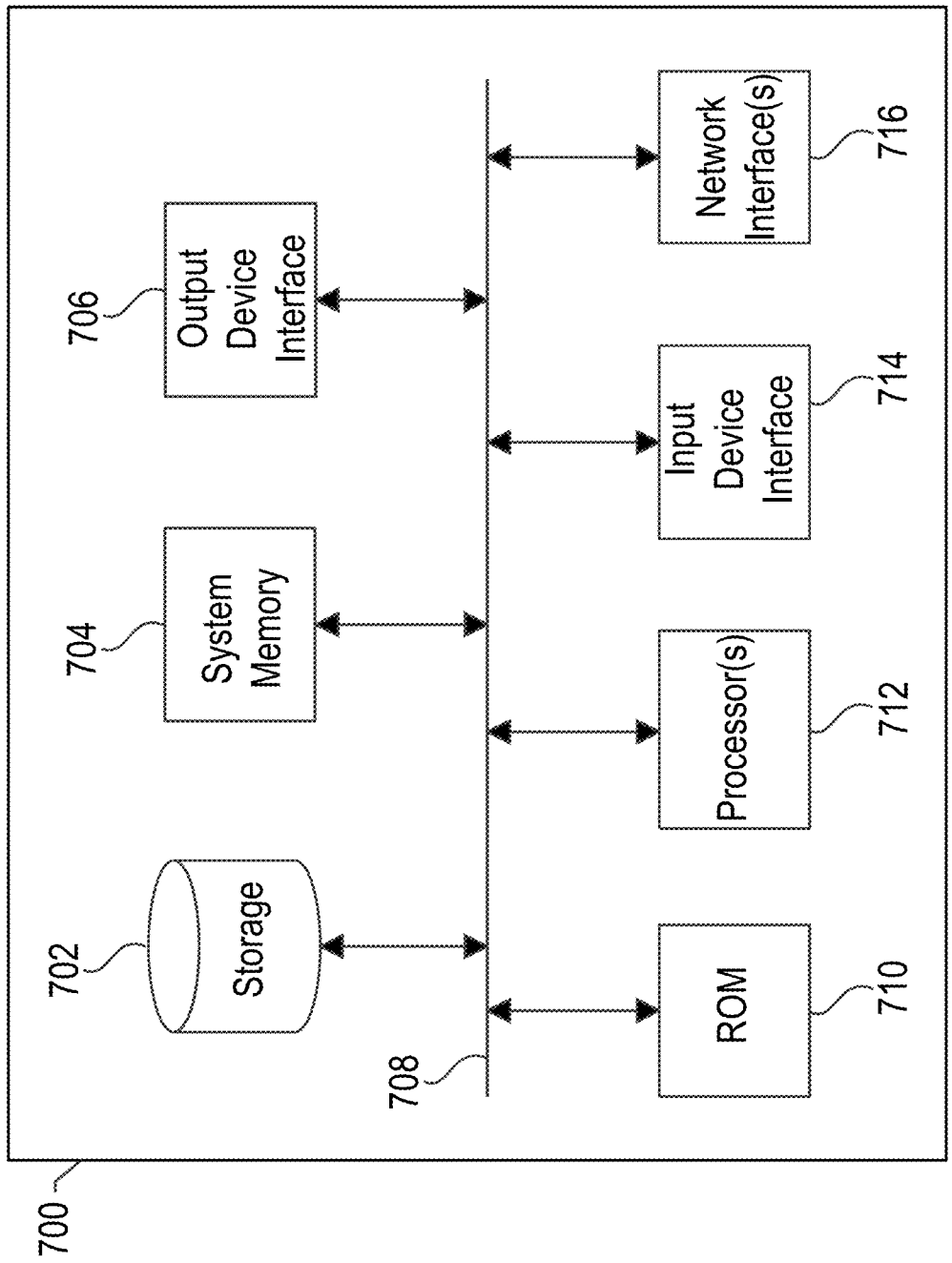
FIG. 7 conceptually illustrates an electronic system with which any implementations of the subject technology are implemented.

FIG. 7 conceptually illustrates an electronic system 700 with which one or more implementations of the subject technology may be implemented. The electronic system 700, for example, can be a network device, a media converter, a desktop computer, a laptop computer, a tablet computer, a set-top box, a server, a smartphone, or generally any electronic device that encodes and/or decodes video and/or audio streams. Such an electronic system 700 includes various types of computer readable media and interfaces for various other types of computer readable media. The electronic system 700 includes a bus 708, one or more processing unit(s) 712, a system memory 704, a read-only memory (ROM) 710, a permanent storage device 702, an input device interface 714, an output device interface 706, and a network interface 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system. The permanent storage device 702, on the other hand, is a read-and-write memory device. The permanent storage device 702 is a non-volatile memory unit that stores instructions and data even when the electronic system 700 is off. One or more implementations of the subject disclosure use a mass-storage device (such as a magnetic or optical disk and its corresponding disk drive) as the permanent storage device 702.

Other implementations use a removable storage device (such as a floppy disk, flash drive, and its corresponding disk drive) as the permanent storage device 702. Like the permanent storage device 702, the system memory 704 is a read-and-write memory device. However, unlike the permanent storage device 702, the system memory 704 is a volatile read-and-write memory, such as random access memory. System memory 704 stores any of the instructions and data that the one or more processing unit(s) 712 needs at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input device interface 714 and the output device interface 706. The input device interface 714 enables a user to communicate information and select commands to the electronic system. Input devices used with the input device interface 714 include, for example, alphanumeric keyboards and pointing devices (also called "cursor control devices"). The output device interface 706 enables, for example, the display of images generated by the electronic system 700. Output devices used with the output device interface 706 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks (not shown) through one or more network interfaces 716. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A network device comprising:
   a memory; and
   at least one processor configured to:
      receive data packets from a server, the data packets being addressed to an electronic device downstream from the network device;
      determine whether the data packets satisfy an offload condition;
      when the data packets satisfy the offload condition:
         transmit, to the server, acknowledgement packets corresponding to the received data packets;
         store the data packets in a buffer;
         transmit the data packets to the electronic device;
         transmit one or more flow control packets to the server based at least in part on a fullness of the buffer, the one or more flow control packets corresponding to transmission of the data packets to the electronic device; and
         retransmit the data packets to the electronic device responsive to request therefor, the retransmitted data packets being retrieved from the buffer.

2. The network device of claim 1, wherein when a TCP/IP connection is established between the server and the electronic device, the at least one processor is configured to operate as a TCP client/sink with respect to the server, and to operate as a TCP server/source with respect to the electronic device.

3. The network device of claim 1, wherein the at least one processor is configured to store payloads of the data packets in the buffer and transmit the payloads in separately generated data packets to the electronic device.

4. The network device of claim 3, wherein the at least one processor is configured to retransmit the data packets by retrieving the payloads from the buffer, packetizing the payloads into additional data packets, and transmitting the additional data packets.

5. The network device of claim 1, wherein the at least one processor is configured to determine whether data packets satisfy an offload condition based on at least one of:
   determining that the data packets are associated with a high bit rate stream;
   determining that the data packets comprise audio-video packets;
   determining that a number of retransmission requests received for the data packets satisfies a threshold amount; or
   determining that the server has been previously selected for packet offload.

6. The network device of claim 1, wherein the at least one processor is further configured to remove the data packets from the buffer when corresponding acknowledgment packets are received from the electronic device.

7. The network device of claim 1, wherein the at least one processor is further configured to:
   when the data packets do not satisfy the offload condition, transmit the data packets to the electronic device without storing the data packets in the buffer.

8. The network device of claim 1, wherein the at least one processor is further configured to:
   when the data packets satisfy the offload condition, offload a network connection corresponding to the data packets to a secondary processor separate from a host processor of the network device.

9. The network device of claim 8, wherein the buffer is dedicated to the network connection corresponding to the data packets.

10. The network device of claim 8, wherein the buffer is shared by the network connection and another network connection.

11. The network device of claim 1, wherein the network device is communicatively coupled to the server via a wide area network, the electronic device is communicatively coupled to the network device via a wireless local area network, and the electronic device is communicatively coupled to the server through the network device.

12. A non-transitory machine readable medium comprising code that, when executed by one or more processors, causes the one or more processors to perform operations, the code comprising:
   code to receive, by a network device, a data packet from a server, the data packet being addressed to an electronic device, and responsively transmit an acknowledgement packet to the server, the code to receive comprising code to receive, by the network device, a first plurality of content streams addressed to the electronic device and a second plurality of content streams addressed to another content device, each of the first and second plurality of content streams comprising data packets;
   code to locally store a copy of a payload of the data packet, generate a separate data packet from the payload, and transmit the separate data packet to the electronic device; and
   code to retrieve, packetize, and retransmit the locally stored copy of the payload of the data packet to the electronic device in response to receipt of a retransmission request for the separate data packet from the electronic device; and code to perform packet by packet pacing for transmitting the first and second plurality of content streams to the electronic device and the other electronic device, respectively, wherein each data packet transmitted to the electronic device for the first plurality of content streams is from a different content stream than a previous data packet transmitted to the electronic device and each data packet transmitted to the other electronic device for the second plurality of content streams is from a different content stream than a previous data packet transmitted to the other electronic device.

13. The non-transitory machine readable medium of claim 12, wherein the code further comprises:
code to remove the copy of the data packet responsive to receipt of an acknowledgment packet corresponding to the data packet.

14. The non-transitory machine readable medium of claim 13, wherein the network device is coupled to the electronic device via a local area network, the network device is coupled to the server via a wide area network that is non-overlapping with the local area network, and the acknowledgement packet is transmitted to the server for the data packet addressed to the electronic device before the data packet addressed to the electronic device is transmitted to the electronic device.

15. A method comprising:
receiving, by a network device, a data packet from a server, the data packet being addressed to an electronic device, and responsively transmitting an acknowledgement packet to the server, wherein the network device is coupled to the electronic device via a local area network and the network device is coupled to the server via a wide area network that is non-overlapping with the local area network;
storing, locally, a copy of a payload of the data packet, generating a separate data packet from the payload, and transmitting the separate data packet to the electronic device after transmitting the acknowledgment packet to the server;
retrieving, packetizing, and retransmitting the locally stored copy of the payload of the data packet to the electronic device in response to receipt of a retransmission request for the separate data packet from the electronic device; and
removing the copy of the data packet responsive to receipt of another acknowledgment packet corresponding to the data packet from the electronic device.

16. The method of claim 15, wherein receiving, by the network device, the data packet from the server, the data packet being addressed to the electronic device comprises:
receiving, by the network device, a first plurality of content streams addressed to the electronic device and a second plurality of content streams addressed to another content device, each of the first and second plurality of content streams comprising data packets.

17. The method of claim 16, further comprising:
performing packet by packet pacing for transmitting the first and second plurality of content streams to the electronic device and the other electronic device, respectively, wherein each data packet transmitted to the electronic device for the first plurality of content streams is from a different content stream than a previous data packet transmitted to the electronic device and each data packet transmitted to the other electronic device for the second plurality of content streams is from a different content stream than a previous data packet transmitted to the other electronic device.

* * * * *